United States Patent [19]

Ackeret

[11] Patent Number: 5,719,714
[45] Date of Patent: Feb. 17, 1998

[54] INTERIOR REAR-VIEW MIRROR OF A MOTOR VEHICLE HAVING AN INTEGRATED STORAGE COMPARTMENT

[75] Inventor: Peter Ackeret, Küsnacht, Switzerland

[73] Assignee: fischerwerke, Artur Fischer GmbH & Co. KG, Waldachtal, Germany

[21] Appl. No.: 256,644

[22] PCT Filed: Feb. 15, 1994

[86] PCT No.: PCT/EP94/00432

§ 371 Date: Jun. 23, 1994

§ 102(e) Date: Jun. 23, 1994

[87] PCT Pub. No.: WO94/18031

PCT Pub. Date: Aug. 18, 1994

[30] Foreign Application Priority Data

| Feb. 15, 1993 | [CH] | Switzerland | 00 446/93 |
| May 7, 1993 | [CH] | Switzerland | 01 403/93 |
| Jun. 18, 1993 | [CH] | Switzerland | 01 813/93 |
| Nov. 19, 1993 | [CH] | Switzerland | 03 451/93 |

[51] Int. Cl.⁶ ............... G02B 7/182; B60R 1/04; G02C 1/00
[52] U.S. Cl. ............... 359/871; 359/838; 351/158
[58] Field of Search ............... 359/838, 841, 359/843, 844, 850, 854, 855, 871, 872; 351/158

[56] References Cited

U.S. PATENT DOCUMENTS

| 2,649,028 | 8/1953 | Lenta | 359/854 |
| 3,588,233 | 6/1971 | Lambert | 359/844 |
| 3,977,774 | 8/1976 | O'Sullivan | 359/865 |
| 4,890,907 | 1/1990 | Vu et al. | 359/843 |
| 4,998,812 | 3/1991 | Hou | 359/841 |
| 5,059,015 | 10/1991 | Tran | 359/871 |

FOREIGN PATENT DOCUMENTS

| 1517348 | 3/1968 | France | 359/872 |
| 0145039 | 11/1980 | Japan | 359/865 |
| 0004440 | 1/1982 | Japan | 359/841 |

*Primary Examiner*—Ricky D. Shafer
*Attorney, Agent, or Firm*—Michael J. Striker

[57] ABSTRACT

An interior rear-view mirror for a motor vehicle has a mirror part, a storage container arranged behind the mirror part and having an underside provided with a housing opening, and a holder movably connected to the storage container for receiving an article to be stored, the holder being movable through the housing opening between an inner rest position in which the holder is enclosed in the storage container, and an outer rest position below the mirror part in which the article to be stored can be removed from the holder or placed in it, the storage container and the holder being joined to one another so as to turn together.

33 Claims, 11 Drawing Sheets

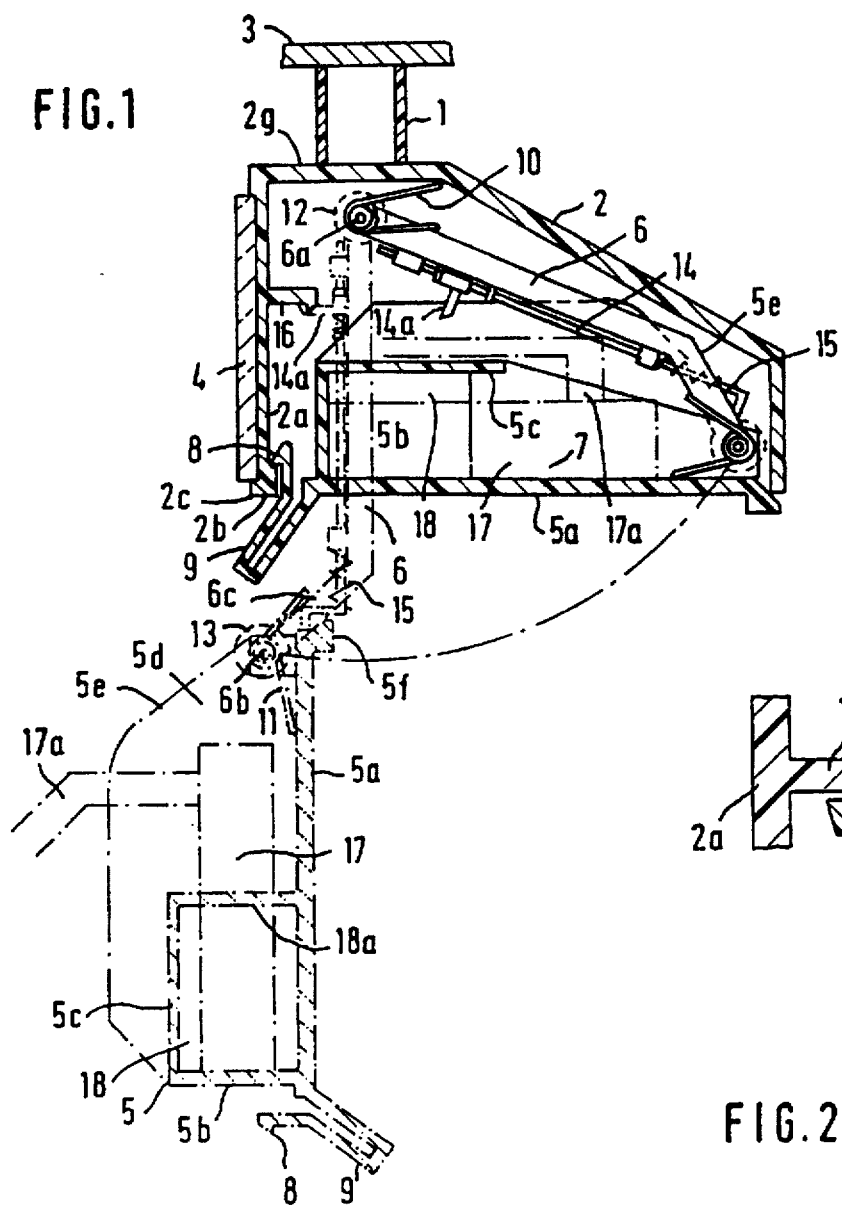
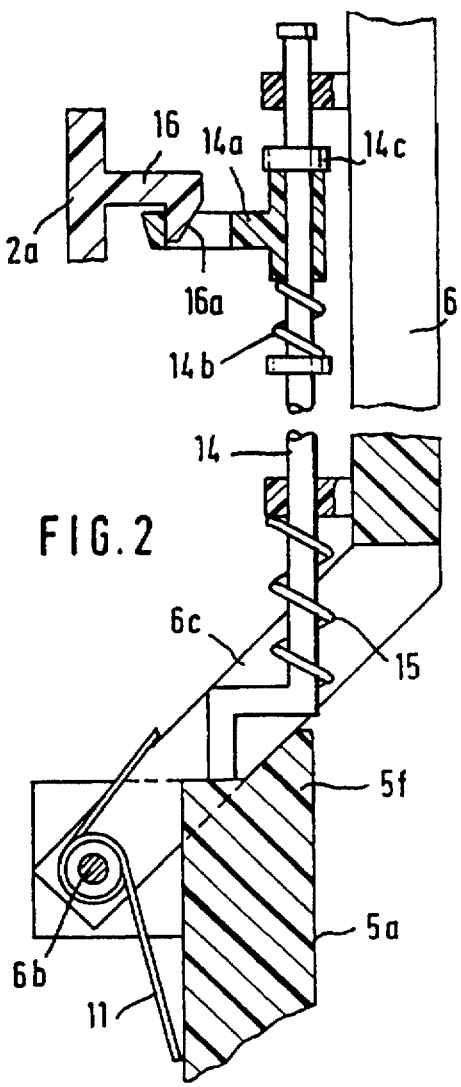

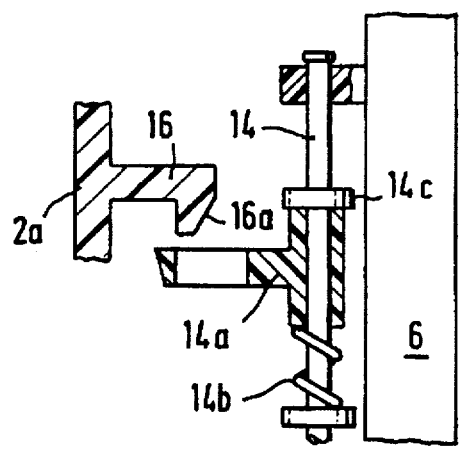
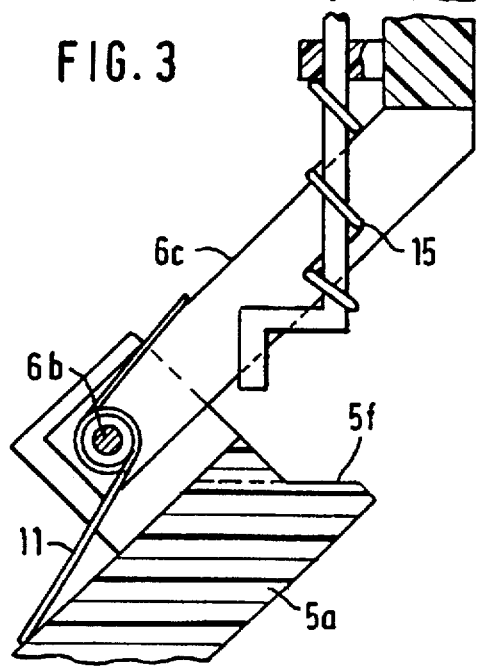
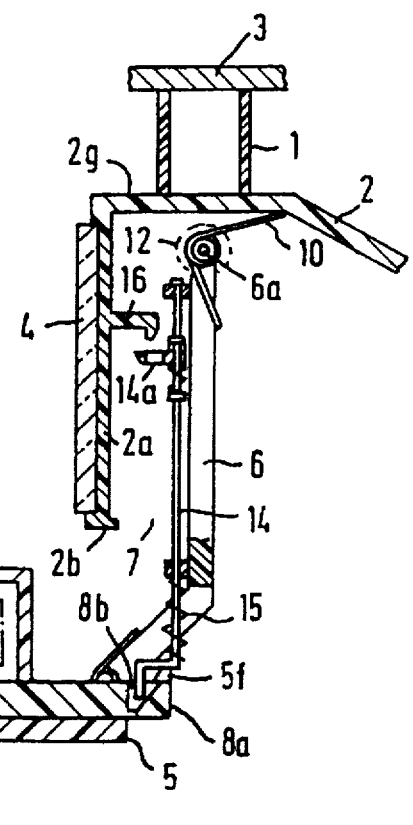
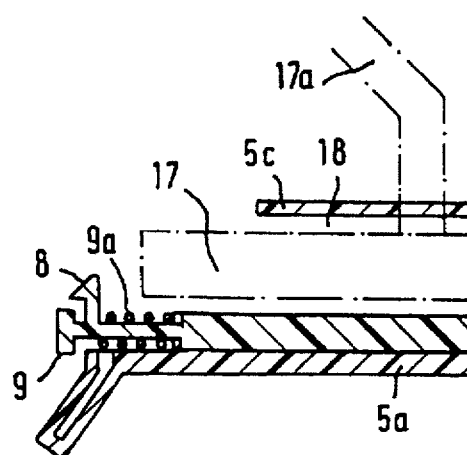

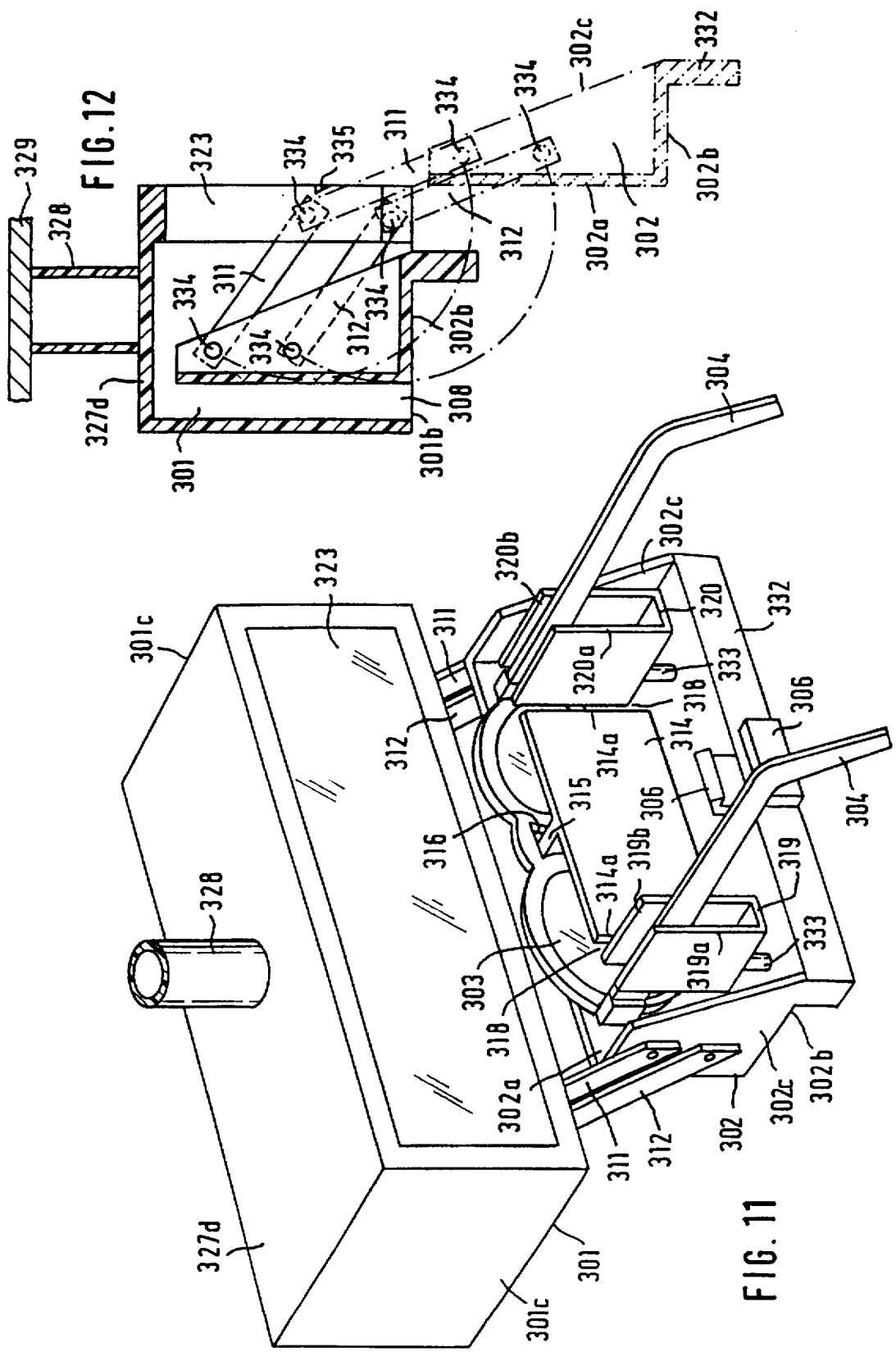

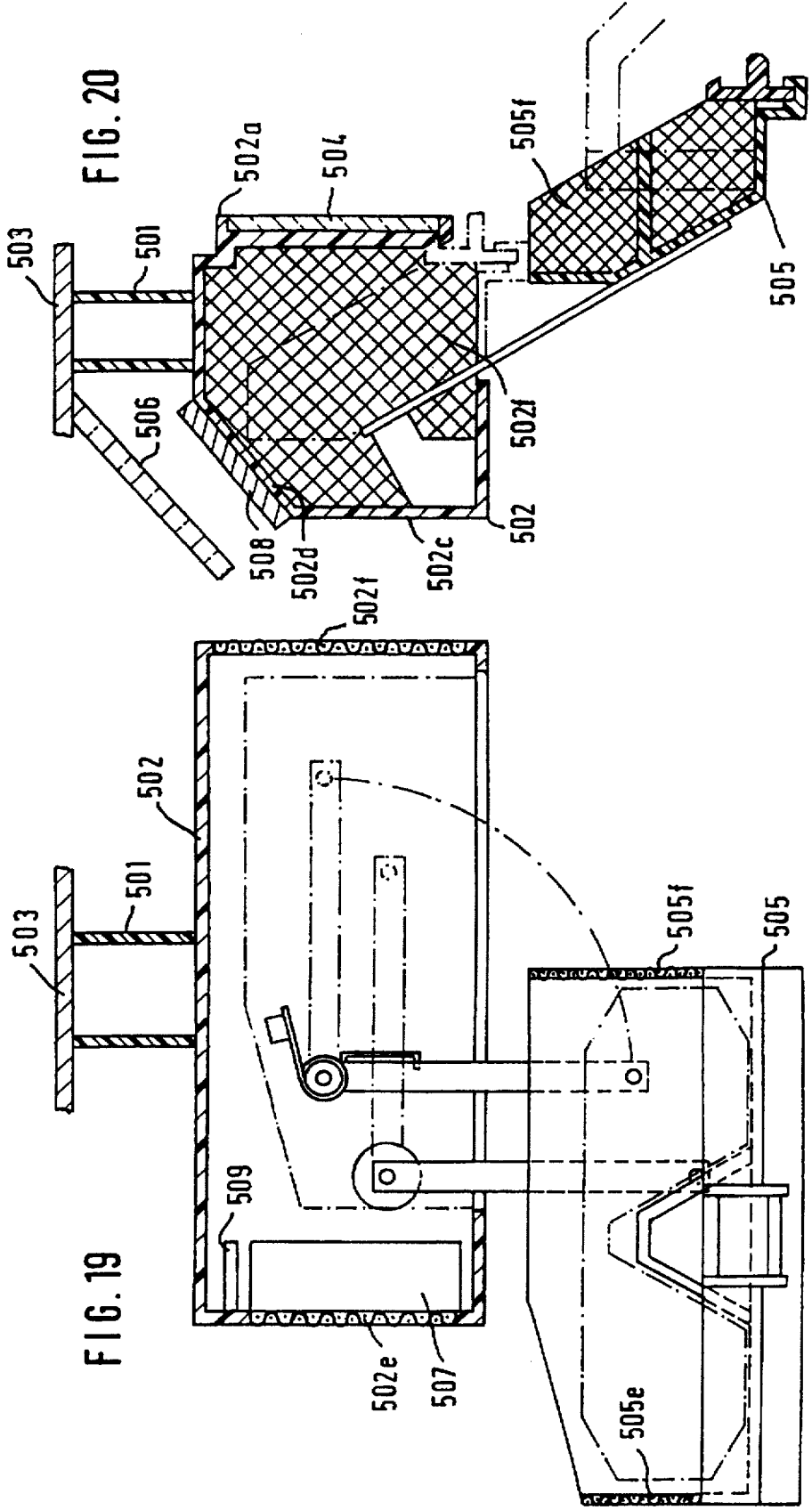

INTERIOR REAR-VIEW MIRROR OF A MOTOR VEHICLE HAVING AN INTEGRATED STORAGE COMPARTMENT

BACKGROUND OF THE INVENTION

The present invention relates to an interior rear-view mirror of a motor vehicle which is provided with a storage compartment and has an extending holder by means of which an article to be stored that is housed in the storage compartment can be moved into an outer rest position in which the stored article can be inserted in the holder or removed therefrom.

In vehicles there is a great demand for storage facilities for keeping various articles such as, for example, road maps, paper handkerchiefs, small change for parking meters, cassettes, compact discs, spectacles, etc..

The compartments originally provided to hold these articles are increasingly being used for the installation of additional items of equipment, such as, for example, a passenger "air bag", telephones and compartments for sound recording media.

Various articles, for example, spectacles, must (should the light suddenly become blinding, or should it become dark) be to hand, often instantly, during travel, so that only one hand is needed for them.

It is therefore necessary for spectacles, for example, to be stored in the vehicle in such a way that the driver can remove them from the storage compartment or insert them in it with one hand, without the driver's attention requiring to be diverted from his driving.

In their stored state, the articles should be protected from dust, dirt and scratching. Screening against the sun's rays is also frequently desirable.

So that operation by the driver is possible during travel, the storage compartment must, on the one hand, be arranged to be mounted in the vehicle and to be operated in such a manner that the driver does not need to avert his gaze from the road. On the other hand, the storage compartment must not obstruct the driver's view.

The installation of the storage compartment in different vehicle models further requires it to be of a type suitable for installation in as wide a variety of vehicles as possible, requiring only minimal and inexpensive adaptations to the individual vehicle models.

SUMMARY OF THE INVENTION

It is the aim of the invention to provide a storage compartment which takes account of the requirements listed.

In keeping with these objects and with others which will become apparent hereinafter, one feature of the present invention resides, briefly stated, in an interior rear-view mirror for a motor vehicle which has a storage compartment arranged behind it and has on its underside a housing opening, and a holder movably connected with a storage compartment for receiving an article to be stored, wherein the holder is movable through the housing opening between an inner rest position in which the holder is enclosed in the storage compartment, and an outer rest position below the rear-view mirror in which the article to be stored can conveniently be removed from the holder or placed in it.

The arrangement of a storage compartment behind a rear-view mirror of a motor vehicle has the following advantages:

The region between the interior rear-view mirror and the front windscreen is in any case hidden by the rear-view mirror and is therefore invisible from the vehicle interior, so that one is not aware at all of the storage compartment in its closed state. The driver's field of vision is therefore not restricted.

For use, the storage compartment can be operated conveniently using one hand, the holder being conveyed automatically into a position below and in front of the rear-view mirror where the driver of the vehicle is able to perform the motions for inserting and removing the stored article using one hand, without being distracted.

In the extended state of the holder, disruption to the field of view is reduced to a minimum despite optimum presentation of the stored article and the view in the rear-view mirror is not obstructed at all.

The storage compartment can be installed in any vehicle merely by exchanging the rear-view mirror, without expensive alterations or adaptations to the interior being necessary, or the restricted installation space in the dashboard or central console being required.

By integrating the storage compartment in an assembly already present in every vehicle and which only requires adaptations, manufacturing costs can be optimized.

With the holder inserted, the articles to be stored are protected in an ideal manner in the storage compartment against dust, dirt, damage and heat.

For ease of handling, the holder can be moved by motor or by spring force; it is advisable to damp the extending movement with the latter option, for example by means of a viscous brake mechanism.

The holder can be constructed as a container for holding different articles for storage or can be specially constructed for holding specific articles.

In place of portable articles for storage, operating elements or indicating devices, which for use are extended from the storage compartment, can be fixedly installed in the holder.

The storage compartment according to the invention is especially suitable for storing spectacles; for this application the holder would advantageously be so constructed that the spectacles could be inserted in the holder or removed therefrom using only one hand, and opening out or folding up the side-pieces of a pair of spectacles inserted in the holder would also be possible using only one hand.

In the following description, the preferred construction for the storage of a pair of spectacles is described, without, of course, the storage compartment according to the invention being restricted to this application.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows diagrammatically a cross-section through the storage compartment with a first embodiment of the holder in the inner and in the outer rest position.

FIGS. 2 and 3 show diagrammatically a detail construction of the locking mechanism of the holder of the embodiment shown in FIG. 1 in the locked and unlocked position.

FIG. 4 shows diagrammatically and in cross-section a fragmentary view of the storage compartment of the embodiment shown in FIG. 1 with a variation in the opening angle of the holder in the outer rest position.

FIGS. 11 and 12 show diagrammatically in a perspective view and in cross-section the storage compartment with a fourth embodiment of the holder in the inner and the outer rest position.

FIGS. 19 and 20 show in diagrammatic longitudinal and cross-section, respectively, a first embodiment of a cooling device for the storage compartment.

DESCRIPTION OF PREFERRED EMBODIMENTS

Figure 5:
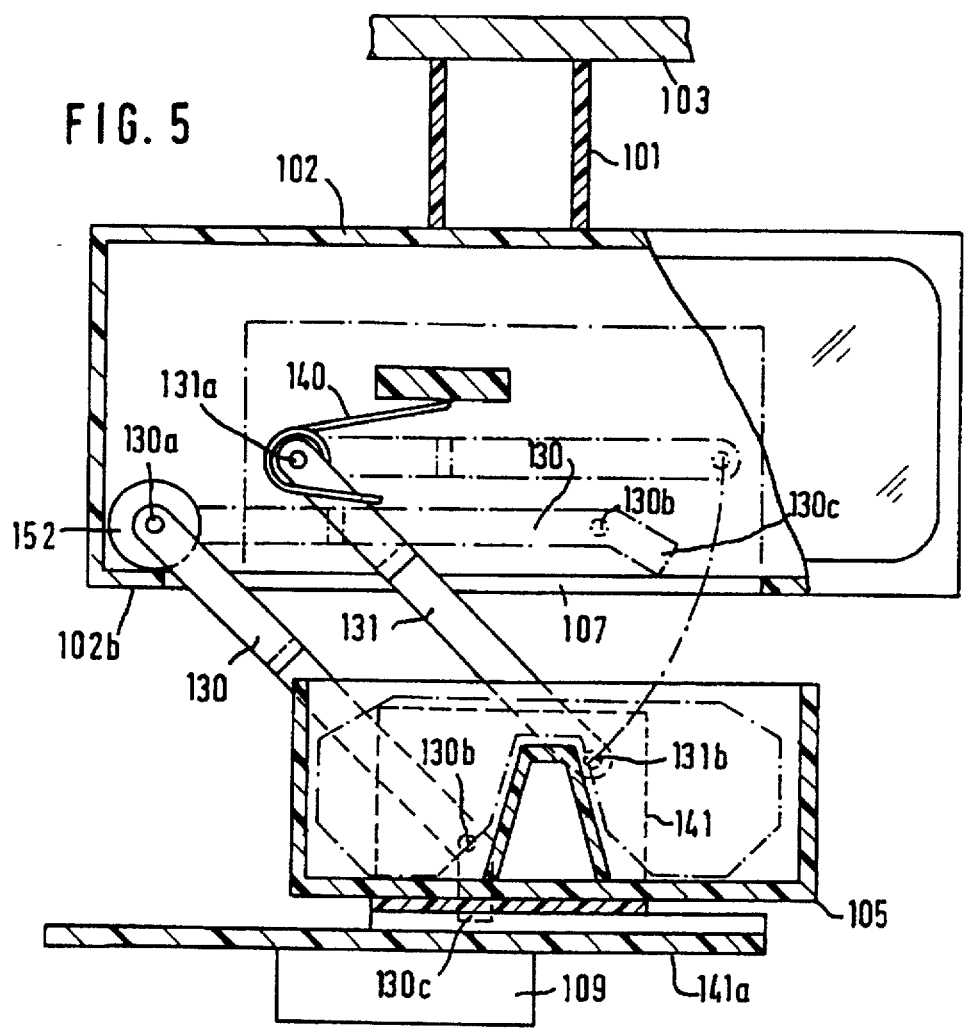
FIGS. 5 to 7 show the storage compartment in diagrammatic longitudinal section and cross-section, with a second embodiment of the holder in the inner and outer rest position.
Figure 6:
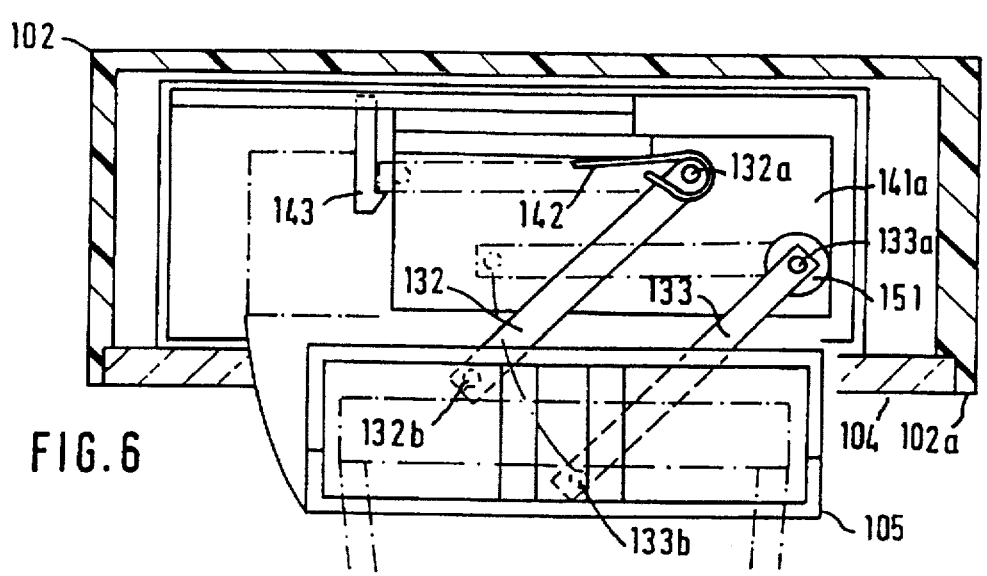
Figure 7:
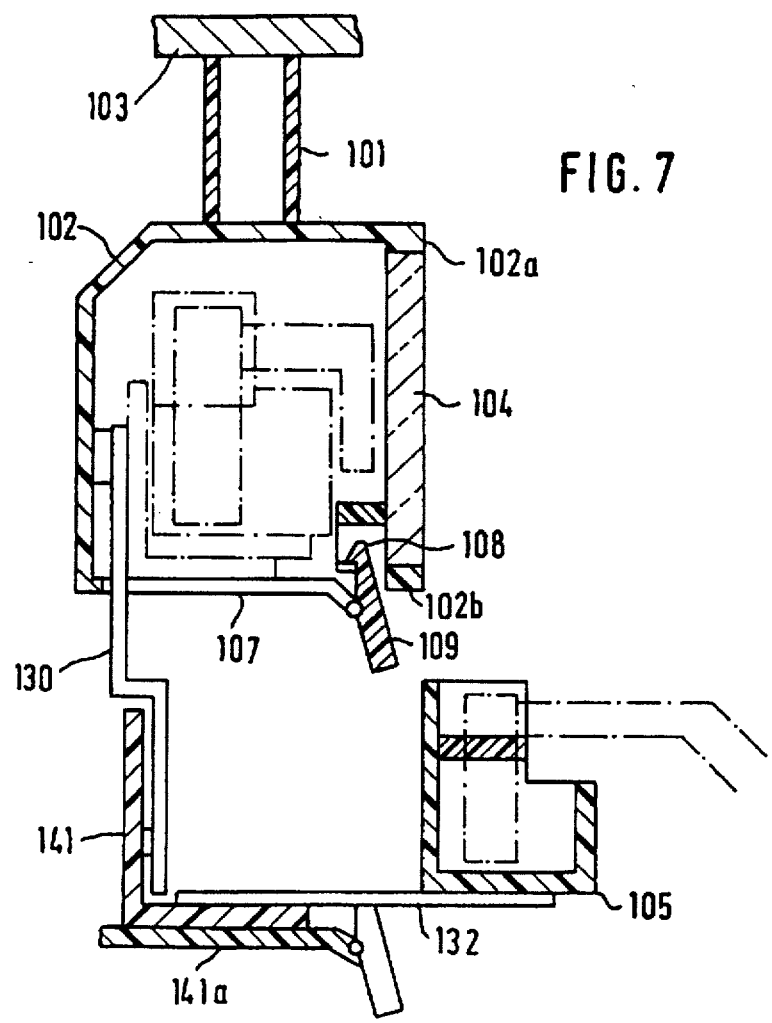
Figure 8:
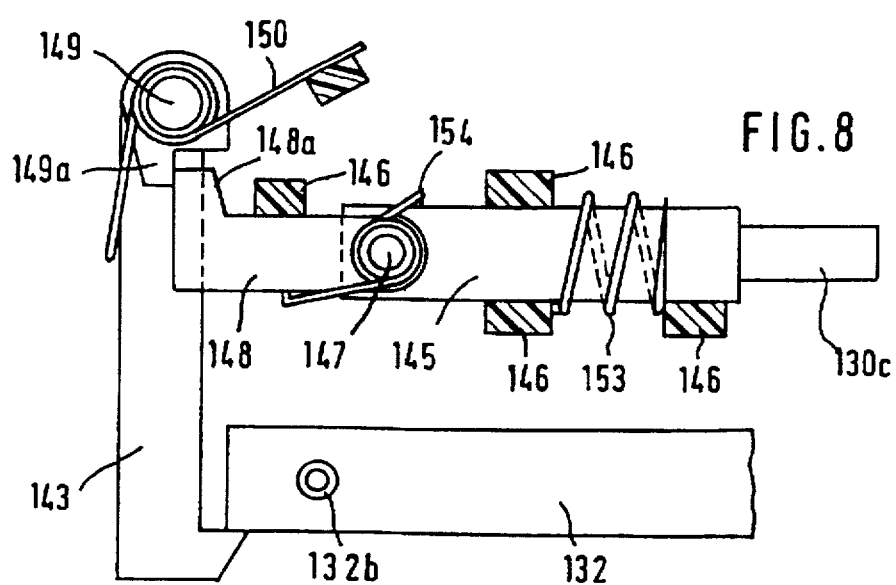
FIG. 8 shows diagrammatically a detail construction of the locking mechanism of the holder of the embodiment shown in FIGS. 5 to 7.

FIGS. 1 to 3 show the storage compartment with a first embodiment of the holder.

The storage compartment 2 is secured to the roof 3 of the vehicle by means of a bracket member 1. The rear-view mirror 4 is arranged on the front wall 2a of the storage compartment 2. A swivel arm 6 joins the holder 5 by means of axles 6a, 6b to the storage compartment 2 so that the holder is able to swivel.

The storage compartment 2 has on its underside 2b a housing opening 7 which is closed by the rear wall 5a of the holder 5 when this is in the inner rest position.

As the locking mechanism 8 is released by way of the push-button-type arm 9, the swivel arm 6 moves about the axle 6a under the influence of the force of the torsion spring 10 downwards out of the housing opening 7.

At the same time, the holder 5 swivels about the axle 6b under the influence of the force of the torsion spring 11 downwards out of the storage compartment 2 into the outer rest position. The swivel arm 6 is angled at its end 6c nearest the holder 5, so that the axle 6b aligns with the plane of the rear-view mirror 4 in the outer rest position of the swivel arm 6.

The stop member 5f limits the opening angle of the holder 5 in its outer rest position, so that the rear wall 5a of the holder 5 lies substantially parallel to the broad face of the rear-view mirror 4.

Damping elements 12, 13 damp both swivelling movements.

A pawl rod 14 is mounted on the swivel arm 6 so as to be longitudinally displaceable towards the catch spring 15. A locking member 14a is mounted on the pawl rod 14 so as to be longitudinally displaceable towards the locking spring 14b.

When the swivel arm 6 reaches its outer rest position, the locking member 14a runs up the ramp 16a of the catch 16 which is arranged on the front wall 2a of the protective housing 2¹. As it does so, the locking member 14a is deflected against the force of the locking spring 14b and snaps into the catch 16.

[1] The integer 2 is elsewhere referred to as the storage compartment-translator.

Locking the swivel arm 6 to the storage compartment 2 ensures that the position of the holder 5 in its outer rest position is stable, and that as the spectacles 17 are inserted into the spectacle support 18 and as the side-pieces 17a of the spectacles are folded up, it is unable to yield backwards.

To close the storage compartment, the holder 5 is swivelled upwards at the push-button-type arm 9. The pawl rod 14 is then able to move downwards under the influence of the catch spring 15. By means of a driving member 14c, the locking member 14a is displaced downwards until it becomes disengaged from the catch 16 and releases the swivel arm 6. Once the locking mechanism is released, the swivel arm 6 can be pushed back against the force of the torsion spring 10 into the storage compartment 2 and at the same time the holder 5 can be folded in against the force of the torsion spring 11 until the inner rest position is reached and the locking mechanism 8 has locked in the storage compartment 2.

The holder 5 has a bottom wall 5b and, running parallel to the rear wall 5a, a front wall 5c which, together with the rear wall 5a, form a U-shaped spectacle support 18 which is closed at both end faces by side walls 5d.

To centre the spectacles 17, mounted in the middle of the spectacle support 18 there is a centring projection 18a, which engages the nose space of an inserted pair of spectacles 17.

The spectacles 17 can be removed parallel to the rear wall 5a upwards out of the spectacle support 18 and are inserted from above into the support, and the spectacle side-pieces 17a are opened out and folded up behind the front wall 5c.

The contours of the front face end edges 5e of the two end walls 5d are designed so that they protrude beyond the contour of a pair of spectacles 17 inserted in the spectacle support 18, so that the spectacles 17 cannot become caught on the storage compartment 2 in the region of its lower front edge 2c as the holder 5 is swivelled from one rest position into the other rest position.

FIG. 4 shows a fragmentary view of a variant of the storage compartment shown in FIGS. 1 to 3.

In the outer rest position, in this embodiment the opening angle of the holder 5 is limited by the stop member 5f so that the rear wall 5a of the holder 5 lies substantially at right angles to the broad face of the rear-view mirror 4.

The spectacles 17 can be removed parallel to the rear wall 5a forwards out of the spectacle support 18 and can be inserted into the support from the front, and the spectacle side-pieces 17a are opened out and folded up behind the front wall.

To release the pawl rod 14 from the catch 16, the locking arm 8a is pressed backwards by the push-button 9 parallel to the rear wall 5a against the force of the spring 9a until the pawl rod 14 is able to drop into the recess 8b of the locking arm 8a. The locking mechanism is thereby released and the swivel arm 6 can be pushed by way of the holder 5 into its inner rest position until the locking mechanism 8, which is releasable by way of the push-button 9 against the force of the spring 9a, has locked in the storage compartment.

FIGS. 5 to 8 illustrate the storage compartment with a second embodiment of the holder.

The storage compartment 102² is fixed to the roof 103 of the vehicle by means of a bracket member 101.

[2] In the description of FIGS. 5 to 8, all the reference numbers have been increased by 100 with respect to the reference numbers in the actual Figures-translator.

The rear-view mirror 104 is arranged on the front wall 102a of the storage compartment 102.

A first vertically movable pair of parallel guide arms 130, 131 and a second horizontally movable pair of parallel guide arms 132, 133 join the holder 105 to the storage compartment 102 so that the holder is able to swivel.

The storage compartment 102 has on its underside 102b a housing opening 107 which is closed by the bottom wall 141a of the carrier 141 when the holder 105 is in its inner rest position.

As the locking mechanism 108 is released by way of the push-button-type arm 109, the parallel guide arms 130, 131 move about the hinges 130a, 131a under the influence of the force of the torsion spring 140 downwards out of the housing opening 107, and transport the holder 105 into an intermediate position vertically below the storage compartment 102.

The L-shaped carrier 141 is hinge-mounted by means of the hinges 130b, 131b on the parallel guide arms 130, 131. The parallel guide arms 132, 133 are hinge-mounted by means of hinges 132a, 133a on the bottom wall 141a of the carrier 141, and are joined to the holder 105 by means of hinges 132b, 133b.

The parallel guide arm 130 is extended beyond the hinge 130b by an angled portion 130c. During the downward movement of the parallel guide arm 130, the angled portion 130c bears on the push-rod 145, which is mounted so as to be longitudinally displaceable in the guides 146 on the bottom plate 141a and is displaceable against the force of the push-rod spring 153.

The push-rod 145 is joined by means of the swivel bearing 147, so as to swivel, to the push-rod extension 148. The retaining lever 13[3] is mounted on the bearing 149 so as to rotate on the base plate 141a. The retaining lever 143 has a cam 149a against which the push-rod extension 148 runs and swivels the retaining lever 143 about the bearing 149 until the parallel guide arm 132 is released.

[3] For consistency with the text, 143, although the drawings show 43-translator.

Once the rear edge 148a of the push-rod extension 148 has travelled over the cam 149a, this is released and under the influence of the restoring spring 150 the retaining lever 143 rotates back into its starting position.

When the parallel guide arm 132 is released, the two parallel guide arms 132, 133 move outwards under the influence of the torsion spring 142 and move the holder 105 beneath and beyond the rear-view mirror 104 into the outer rest position.

Both the vertical and the horizontal swivel movement of the parallel guide arms 130, 131 and 132, 133 are damped by damping elements 151, 152.

The releasing mechanism ensures that the horizontal swivel movement of the parallel guide arms 132, 133 is not initiated until the vertical swivel movement of the parallel guide arms 130, 131 has finished and the holder 105 has been moved completely out of the storage compartment 102 and has reached its intermediate position vertically beneath the storage compartment 102.

As the holder 105 is pushed back from its outer rest position into its inner rest position, it is first of all pushed into the intermediate position beneath the storage compartment 102, where the parallel guide arm 132 snaps into the retaining lever 143 and is held securely against the force of the torsion spring 142.

The holder 105 can subsequently be introduced together with the carrier 141 through the housing opening 107 upwards into the storage compartment 102, until the inner rest position is reached and the locking mechanism 108 has locked.

As the parallel guide arm 130 is swivelled upwards, the angled portion 130c releases the push-rod 145, which moves back, under the influence of the push-rod spring 153, into its initial position. As it does so, the push-rod extension 148, controlled by its rear edge 148a, pivots outwards, in order to be able to move past the cam 149a, and it then swivelled back by the swivelling spring 154 into its initial position.

Figure 10:
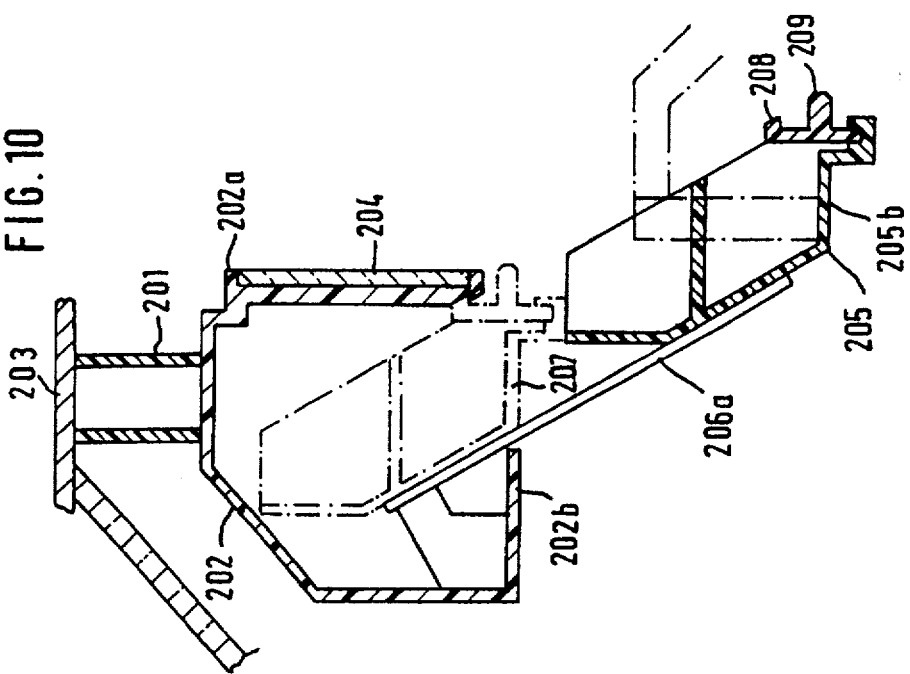
FIGS. 9 and 10 show in diagrammatic longitudinal and cross-section, respectively, the storage compartment with a third embodiment of the holder in the inner and the outer rest position.
Figure 9:
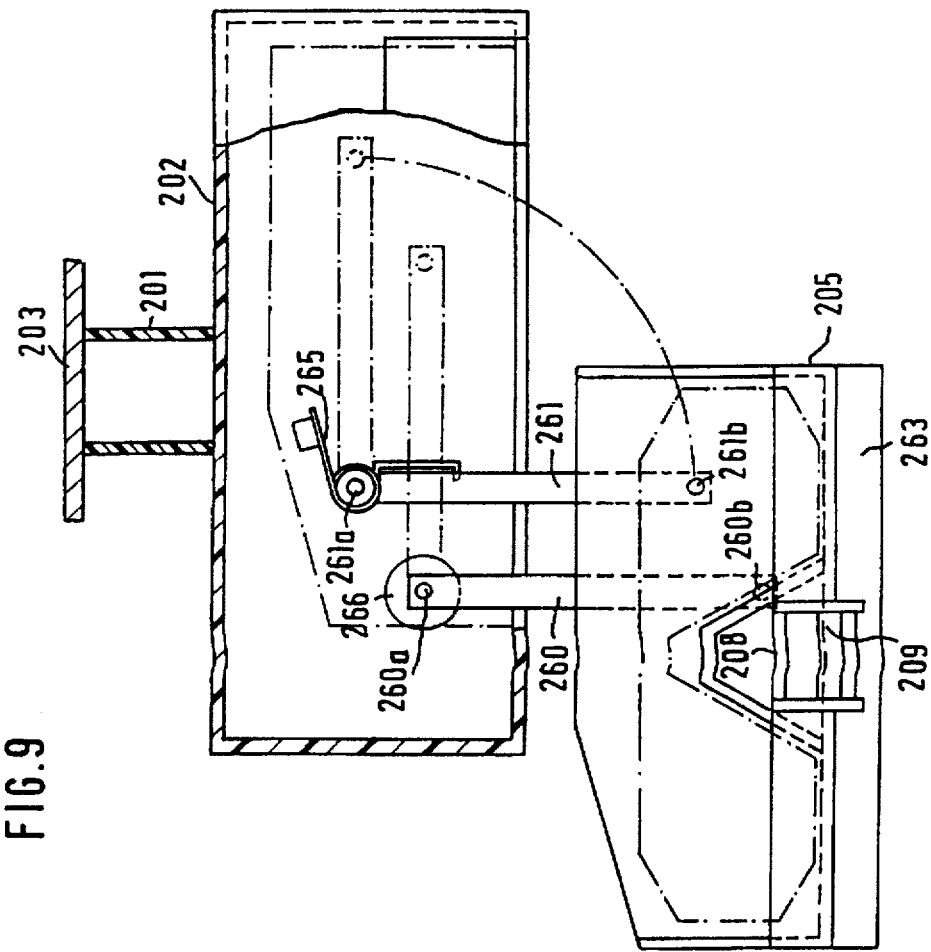

The storage compartment with a third embodiment of the holder is illustrated in FIGS. 9 and 10.

The storage compartment 202[4] is fixed to the roof 203 of the vehicle by means of the bracket member 201. The rear-view mirror 204 is arranged on the front wall 202a of the storage compartment 202. A pair of parallel guide arms 260, 261 joins the holder 205 to the storage compartment 202 by means of the hinges 260a, 261a, 260b, 261b so that the holder is able to swivel. The parallel guide arms 260, 261 are fixed to the storage compartment 202 and to the holder 205 in an inclined position so that as it is displaced from the storage compartment 202, the holder 205 moves simultaneously downwards and obliquely forwards.

[4] Reference numbers in the description of FIGS. 9 and 10 have been increased by 200 with respect to the reference numbers in the actual Figures-translator.

The storage compartment 202 has on its underside 202b a housing opening 207 which is closed by the bottom wall 205b of the holder 205 when this is in its inner rest position.

As the locking mechanism 208 is released by way of the push-button-type arm 209, the parallel guide arms 260, 261 move about the hinges 260a, 261a obliquely downwards out of the housing opening 207 under the influence of the torsion spring 265, and in so doing displace the holder 205 guided parallel by means of the hinges 260b, 261b into the outer rest position beneath and in front of the rear-view mirror 204. The extending movement is damped by means of a damping element 266.

As the holder 205 is pushed back from the outer to the inner rest position, it is guided by way of the parallel guide arms 260, 261 obliquely backwards and upwards through the housing opening 207 into the storage compartment 202 until the locking mechanism 208 on the storage compartment 202 has locked.

A grab bar 263, by which the holder 205 can be held during its swivel movement from one rest position to the other, is provided on the holder 205.

In FIGS. 11 and 12, the storage compartment 301 is secured by way of a bracket element 328 to the roof of the vehicle bodywork 329. A rear-view mirror 323 is integrated in the storage compartment 301. The storage compartment 301 has on its lower wide face 301b a housing opening 308. By means of parallel guide members 311, 312, the holder 302 is connected to the storage compartment 301 so as to perform a rotary movement. The parallel guide members 311, 312 can rotate about bearings 334, which are arranged on the side walls 301c of the storage compartment 301 and on the side walls 302c of the holder 302.

In the inner rest position, the holder 302 is enclosed in the storage compartment 301. The cover 302b on the underside of the holder 302 then substantially covers over the housing opening 308 of the storage compartment 301. After manual release of the locking mechanism 306, which is arranged in the closure rail 332 of the holder 302, the holder moves under the effect of spring force downwards out of the storage compartment 301 into its outer rest position. To close the device, the holder 302 is pushed at the closure rail 332 from its outer rest position back into the storage compartment 301 against the spring force, until the locking mechanism 306 has locked.

The holder 302 has an L-shaped cross-section which is formed by the rear wall 302a and the base wall 302b and is closed on its end faces by the two side walls 302c. A supporting wall 314 extends vertically upwards from the base wall 302b and extends parallel to the rear wall 302a. Together with the latter, the supporting wall 314 forms the spectacle holder. In the middle, the rear wall 302a and the supporting wall 314 are joined to one another by way of a centring device 315 which engages the nose space 316 of an inserted pair of spectacles 303 and centres these in the spectacle holder. At its lateral ends 314a, the supporting wall 314 has openings 318 for the side-pieces 304 of the spectacles, which openings extend substantially over the height of the supporting wall 314.

Arranged in the region of the openings 318 are arms 319, 320 which are rotatably mounted in the base wall 302b by means of swivelling axles 333. The side-pieces 304 of the spectacles are inserted between the carriers 319a, 319b, 320a, 320b of the arms 319, 320 as the spectacles 303 are inserted and, as the arms rotate about the swivelling axles 333, are folded up behind the supporting wall 314. When the spectacles are removed, they are lifted upwards out of the spectacle holder and at the same time withdrawn from the carriers. Rotation of the arms 319, 320 is initiated (in a manner not illustrated) by the movement of the holder from one rest position into the other, and consequently the spectacle side-pieces are respectively folded up and opened out as the holder is inserted and extended.

To secure the interior rear-view mirror in the vehicle, a bracket element 328 is provided; this bracket element is connected to one of the side faces 301c or to the top face 327d of the storage compartment 301. This allows a very compact construction with minimum dimensions. Rotation and swivelling of this storage compartment 301 for adjustment of the rear-view mirror 323 is effected (in a manner not illustrated) by means of hinges between the bracket element 328 and the storage compartment 301 and the vehicle bodywork 329, respectively.

The outer rest position of the holder 302 is determined by a stop member 335, against which the spring force presses the parallel guide members 311. The angle of rotation of the parallel guide member 311 is thus fixed in such a way that the holder comes to lie in its outer rest position in front of the rear-view mirror 323, so that the spectacles 303 can conveniently be inserted in and removed from the spectacle holder.

The parallel guide members 311, 312 ensure that the spectacle holder is held in a parallel position throughout its swivelling movement.

FIGS. 13 to 18 show alternative methods by which the holder can be moved relative to the storage compartment.

Figure 13:
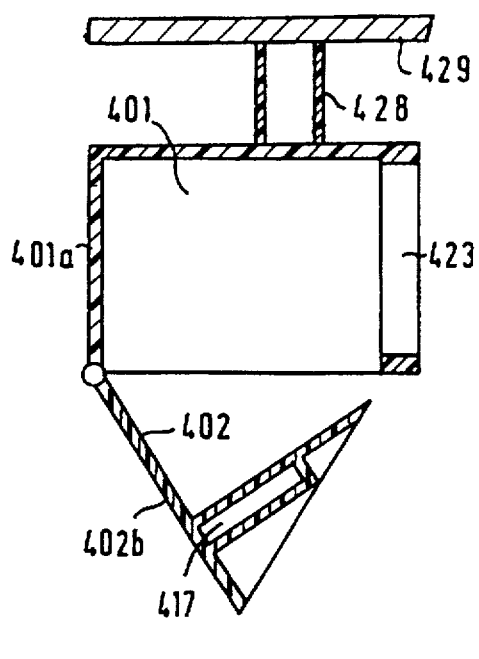
FIGS. 13 to 18 show diagrammatic cross-sections of the storage compartment with further variations of holders in the outer rest position.

In FIG. 13, the holder 402 is articulated on the storage compartment 401 in the region of the lower edge of the rear wall 401a and can be folded down far enough for the spectacles to be removed in an upward direction out of the pocket-like recess 417 which is arranged at right angles on the cover 402b.

Figure 14:
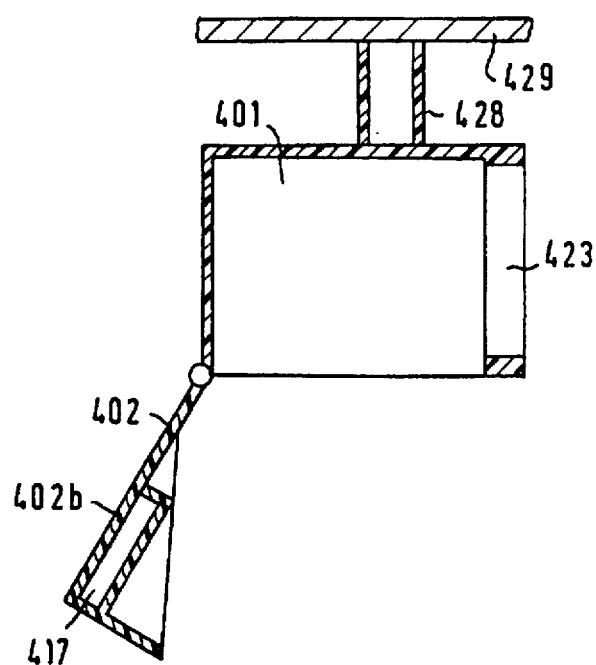

In FIG. 14, a connection between the storage compartment 401 and the holder 402 is provided analogous to that in FIG. 13, the pocket-like recess 417 being arranged parallel to the cover 402b so that the holder 402 has to be folded down correspondingly further out of the storage compartment 401 until the spectacles can be removed.

Figure 15:
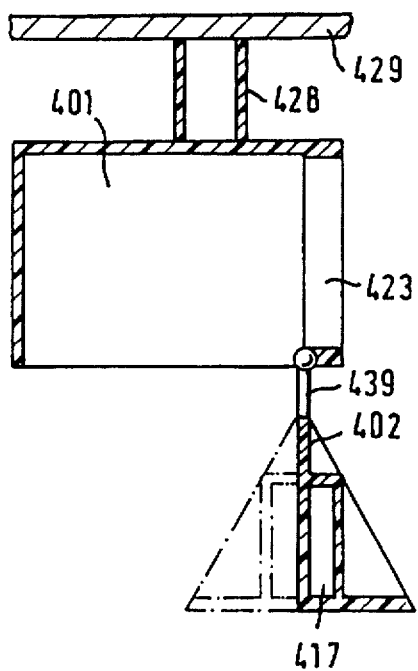

In FIG. 15, the holder 402 is hinge-mounted in the region of the lower edge of the rear-view mirror 423. After folding down the holder 402 into its outer rest position, it can be rotated about an axis 439 so that the pocket-like recess 417 is freely accessible from the front.

Figure 16:
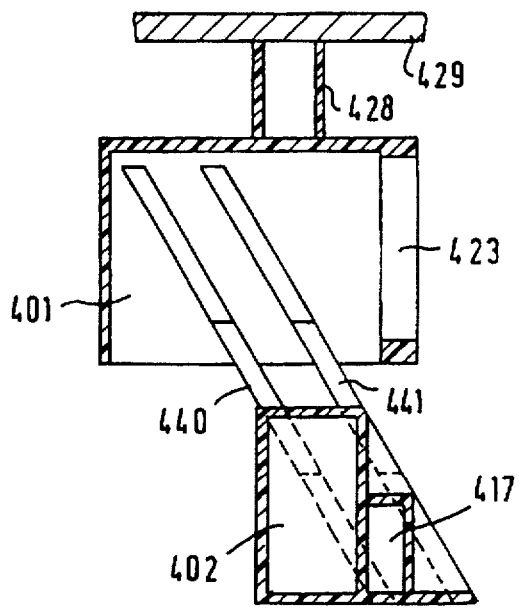

FIG. 16 shows a variant with a longitudinally displaceable holder 402 which can be moved obliquely downwards out of the storage compartment 401 by way of parallel guide members 440, 441.

Figure 17:
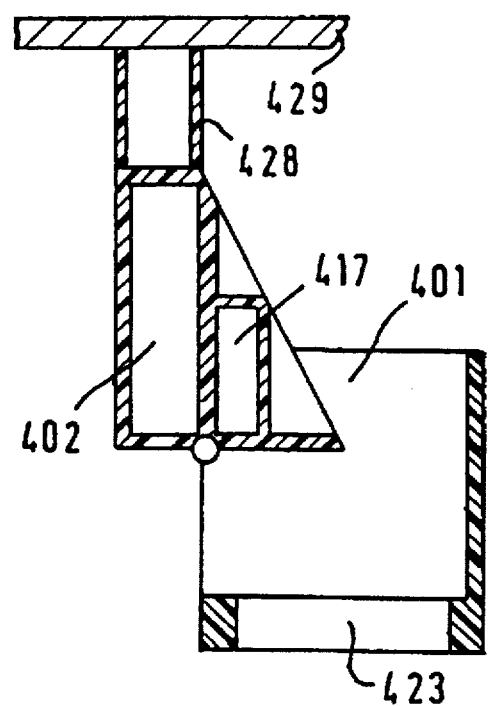

FIG. 17 shows a variant in which the holder 402 is connected to the vehicle bodywork 429 by way of the bracket element 428. The storage compartment 401, which contains the rear-view mirror 423, is hinge-mounted on the holder 402 and can be moved downwards together with the rear-view mirror 423 far enough for the spectacles to be conveniently inserted into the holder 402 or removed from it.

Figure 18:
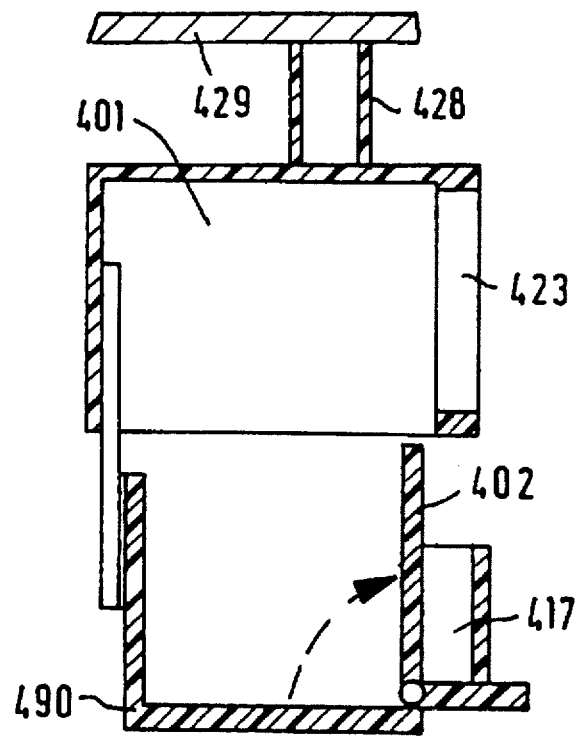

FIG. 18 shows a variant in which the holder 402 is arranged to be rotated out of a carrier 490 that is movable vertically downwards out of the storage compartment. The holder 402, with the carrier 409 extended, can be opened out forwards, so that the spectacles can be swivelled from the lying storage position into a vertical removal and insertion position.

FIGS. 19 and 20 illustrate a first embodiment of a cooling device for the storage compartment.

The storage compartment 502 is fixed to the roof 503 of the vehicle by means of the bracket member 501. The rear-view mirror 504 is arranged on the front wall 502a of the storage compartment 502.

The rear wall 502c and the top wall 502d of the storage compartment 502 lie vertically below the front windscreen 506 of the vehicle. When the sun is strong, the storage device can therefore heat up considerably.

In order to dissipate heat stored in the storage compartment 502, an electrically operated fan 507 is arranged on the side wall 502e of the storage compartment 502 provided with air slots; air entering via the air slots at the side wall 502f is drawn out of the storage compartment 502 by the fan.

So that the air in the storage compartment 502 is able to circulate with as little hindrance as possible, the side walls 505e and 505f of the holder 505 are also provided with air slots.

The fan 507 is preferably supplied with current by way of a solar collector 508 directed towards the front windscreen 506, but supply from the vehicle supply system by way of a temperature gauge 509 arranged in the storage compartment 502 is also possible.

Figure 21:
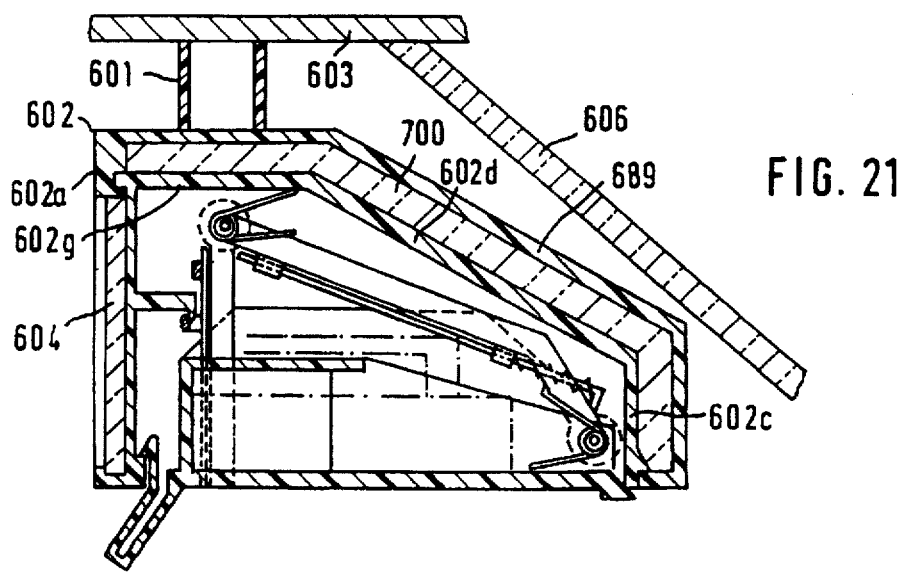
FIGS. 21 and 22 show in diagrammatic longitudinal and cross-section, respectively, a second embodiment of a cooling device for the storage compartment.
Figure 22:
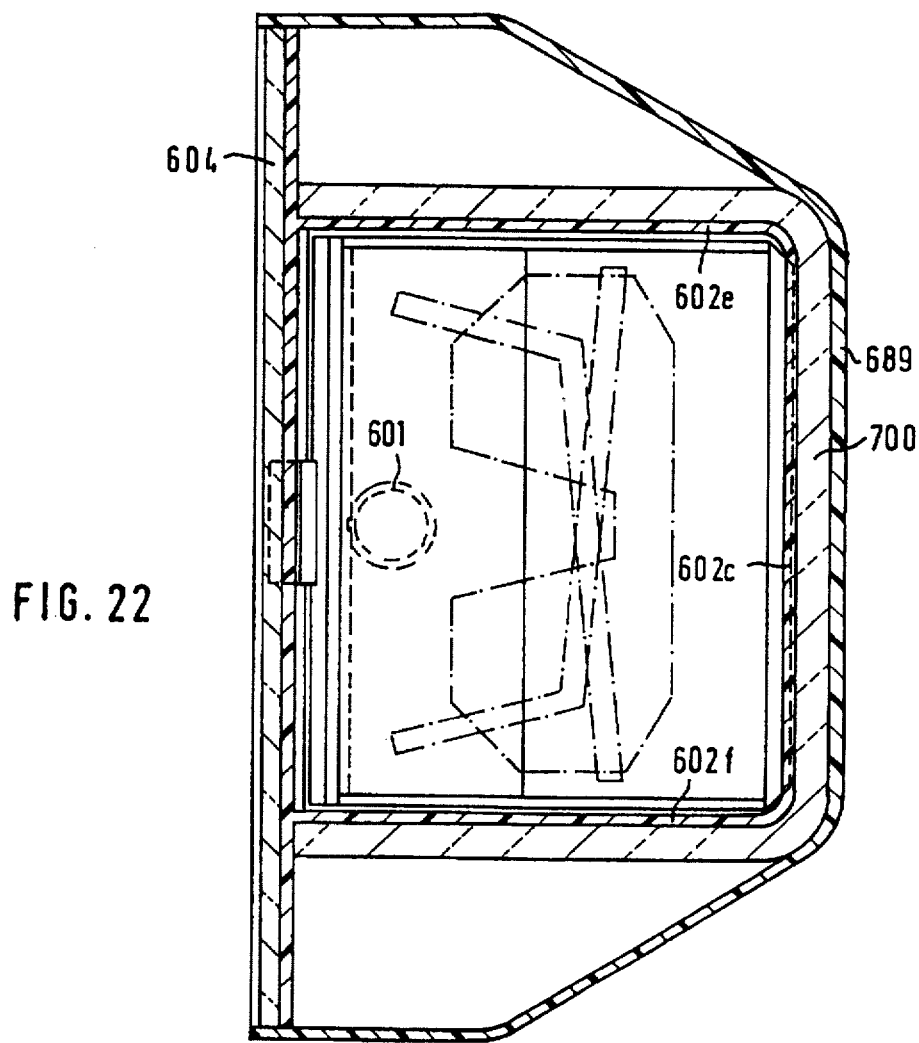

FIGS. 21 and 22 show a second embodiment of a cooling device for the storage compartment.

The storage compartment 602 is fixed to the roof 603 of the vehicle by means of the bracket member 601. The rear-view mirror 604 is arranged on the front wall 602a of the storage compartment 602.

The rear wall 602c, the two side walls 602e, 602f and the top walls 602d, 602g of the storage compartment, which lie in the area on which the sun shines directly through the front windscreen 606, are covered with a heat protection hood 700 of a highly insulating thermal insulation material.

The heat protection hood 700 is inserted as a moulded part between the walls 602c, 602d, 602g, 602e, 602f of the storage compartment 602 and the covering 689 fixed to it.

Figure 23:
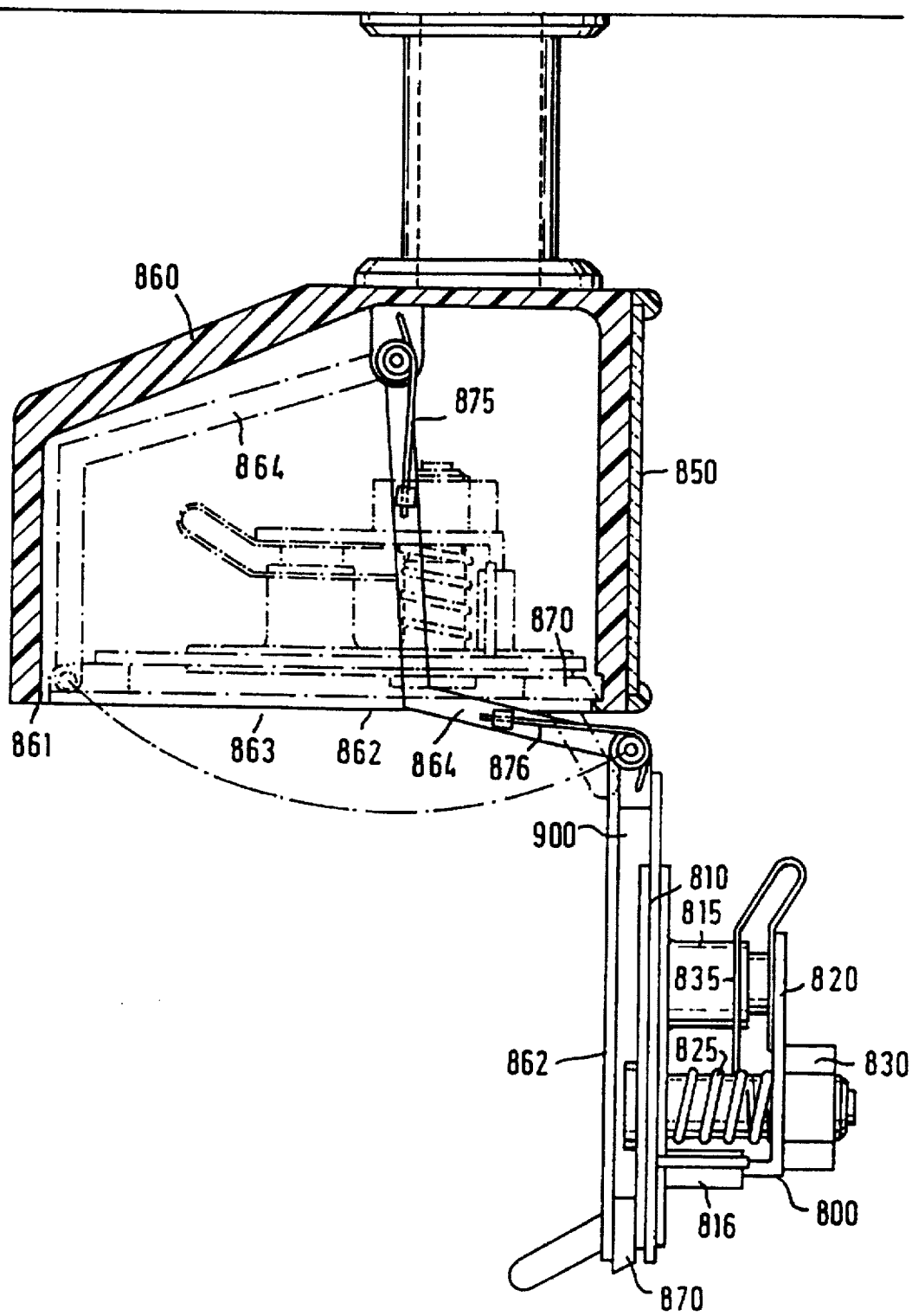
FIG. 23 shows in cross-section the interior rear-view mirror according to the embodiment of FIG. 1 with the holder in the inner and the outer rest position and a spectacle support arranged on the holder.

FIG. 23 shows an embodiment according to FIG. 1 having a holder 900 joined to the storage compartment 860 by means of a swivel arm 865. Mounted on the holder 900 is a spectacle support 800 with a rear wall 810 and a pressure plate 820 movably joined thereto by means of parallel guides 815, 816; the pressure plate is pressed by a spring 825 against the adjusting nut 830.

By turning the adjusting nut 830, the distance between the rear wall 810 and the pressure plate 820 can be continuously matched to the thickness of a pair of inserted spectacles.

The spring plate 835 arranged between the rear wall 810 and the pressure plate 820 ensures firstly that the spectacles are not damaged as the adjusting nut 830 is turned, and secondly that even when the spectacles fit snugly, they can be removed from and inserted in the spectacles support 800 without great pressure.

The centring means 815, which engages the nose space of a pair of inserted spectacles, centres the spectacles laterally in the spectacle support.

The spectacles are inserted in and removed from the spectacle support 800 with their broad face parallel to the plane of the rear-view mirror 850.

In the inner rest position of the holder 900, the spectacles lie in the storage compartment with their broad face substantially at right angles to the plane of the rear-view mirror 850.

It will be understood that each of the elements described above, or two or more together, may also find a useful application in other types of constructions differing from the types described above.

While the invention has been illustrated and described as embodied in an interior rear-view mirror of a motor vehicle having an integrated storage compartment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An interior rear-view mirror for a motor vehicle, comprising a mirror part; a storage container arranged behind said mirror part and having an underside provided with a housing opening; and a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it, said storage container and said holder being joined to one another so as to turn together with one another.

2. An interior rear-view mirror as defined in claim 1; and further comprising a cover arranged to close said housing opening.

3. An interior rear-view mirror as defined in claim 2, wherein said cover is arranged on said holder.

4. An interior rear-view mirror as defined in claim 1, and further comprising spring means arranged so that said holder is moved by said spring means from one into the other of said rest positions.

5. An interior rear-view mirror as defined in claim 1; and further comprising a manually releasably locking mechanism which fixes said holder in said inner rest position in said storage container.

6. An interior rear-view mirror as defined in claim 1, wherein said holder has grip means for guiding said holder from one into the other of said rest positions.

7. An interior rear-view mirror as defined in claim 6, wherein said grip means is gripped in the inner rest position of said holder beneath said mirror part.

8. An interior rear-view mirror as defined in claim 1; and further comprising parallel guide means which joins said holder to said storage container.

9. An interior rear-view mirror as defined in claim 1, wherein said holder has a substantially L-shaped cross-section.

10. An interior rear-view mirror as defined in claim 1, wherein said mirror part and said storage container form a single assembly; and further comprising a bracket element which rotatably joins said single assembly to a vehicle bodywork.

11. An interior rear-view mirror for a motor vehicle, comprising a mirror part; a storage container arranged behind said mirror part and having an underside provided with a housing opening; a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it; and a carrier which joins said storage container and said holder with one another, said storage container and said carrier being joined to one another so as to turn together with one another.

12. An interior rear-view mirror as defined in claim 11, wherein said storage container, said carrier and said holder are formed so that a movement between said storage container and said carrier and between said carrier and said holder is not initiated until a respective other movement has finished.

13. An interior rear-view mirror for a motor vehicle, comprising a mirror part; a storage container arranged behind said mirror part and having an underside provided with a housing opening; and a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it; a carrier which joins said storage container and said holder with one another; and guide members which join said storage container and said carrier with one another so that said storage container and said carrier are longitudinally displaceable.

14. An interior rear-view mirror for a motor vehicle, comprising a mirror part; a storage container arranged behind said mirror part and having an underside provided with a housing opening; a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it; and a carrier which joins said storage container and said holder with one another, said carrier and said holder being joined to one another so as to turn together with one another.

15. An interior rear-view mirror for a motor vehicle, comprising a mirror part; a storage container arranged behind said mirror part and having an underside provided with a housing opening; a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it; a carrier which joins said storage container and said holder with one another; and guide members which join said carrier and said holder with one another so that said carrier and said holder are longitudinally displaceable.

16. An interior rear-view mirror for a motor vehicle, comprising a mirror part; a storage container arranged behind said mirror part and having an underside provided with a housing opening; a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it; and a swivel arm by which said holder is joined to said storage container.

17. An interior rear-view mirror as defined in claim 16, wherein said swivel arm is mounted in said storage container so as to rotate about an axle parallel to a broad face of said mirror part.

18. An interior rear-view mirror as defined in claim 16, wherein said holder is mounted on said swivel arm so as to rotate about an axle parallel to a broad face of said mirror part.

19. An interior rear-view mirror as defined in claim 16, wherein said swivel arm has an L-shaped cross-section.

20. An interior rear-view mirror as defined in claim 16, wherein said swivel arm is joined to said holder by a hinge which aligns in the outer rest position substantially with a plane of said mirror part.

21. An interior rear-view mirror as defined in claim 16, wherein in said inner rest position of said holder, said swivel arm is substantially perpendicular to a broad face of said mirror part, and in said outer rest position of said holder said swivel arm is substantially parallel to the broad face of said rear-view mirror.

22. An interior rear-view mirror as defined in claim 16; and further comprising a releasable locking member which locks said swivel arm and said storage container in said inner rest position.

23. An interior rear-view mirror for a motor vehicle, comprising a mirror part; a storage container arranged behind said mirror part and having an underside provided with a housing opening; a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it, and parallel guide means which joins said holder to said storage container, said parallel guide means including first parallel guide arms by which said holder is joined to said storage container and which moves the holder vertically, and second parallel guide arms which join said holder to said storage container and moves said holder horizontally.

24. An interior rear-view mirror as defined in claim 23; and further comprising a locking member which does not release the horizontal parallel guide arms until the vertical parallel guide arms have reached their end position.

25. An interior rear-view mirror for a motor vehicle, comprising a mirror part; a storage container arranged behind said mirror part and having an underside provided with a housing opening; a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it; and parallel guide means which joins said holder to said storage container said parallel guide arms being articulated on said storage container and on said holder at an angle, so that vertical movement of said holder a horizontal displacement of said holder is effected at the same time.

26. An interior rear-view mirror for a motor vehicle, comprising a mirror part; a storage container arranged behind said mirror part and having an underside provided with a housing opening; and a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it, said holder being arranged so that in the outer rest position lies in front of said mirror part.

27. An interior rear-view mirror as defined in claim 26; and further comprising guide members joining said storage container and said holder with one another so that said storage container and said holder are longitudinally displaceable relative to one another.

28. An interior rear-view mirror for a motor vehicle, comprising a mirror part; a storage container arranged behind said mirror part and having an underside provided with a housing opening; and a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it, said holder having a spectacle support which holds the spectacles.

29. An interior rear-view mirror as defined in claim 28, wherein said spectacle support is formed so that a broad face of the spectacles in said outer rest position of said holder is substantially parallel to a plane of said mirror part and in front of it can be inserted into said holder or removed therefrom.

30. An interior rear-view mirror as defined in claim 28, wherein said spectacle support is formed so that a broad face of the spectacles in said inner rest position of said holder is substantially parallel to a plane of said rear-view mirror.

31. An interior rear-view mirror as defined in claim 28, wherein said spectacle support is formed so that a broad face of the spectacles in said inner rest position of said holder is substantially perpendicular to a plane of said rear-view mirror.

32. An interior rear-view mirror as defined in claim 28, wherein said spectacle support is formed so that the spectacles are held in said spectacle support so that in said outer rest position of said holder the spectacles can be opened out and folded up.

33. An interior rear-view mirror for a motor vehicle, comprising a mirror part; a storage container arranged behind said mirror part and having an underside provided with a housing opening; and a holder movably connected to said storage container for receiving an article to be stored, said holder being movable through said housing opening between an inner rest position in which said holder is enclosed in said storage container, and an outer rest position below said mirror part in which the article to be stored can be removed from said holder or placed in it; and electrically operated fan arranged in said storage container so as to ventilate an interior of said storage container.

* * * * *